W. DITTMEYER.
BELT SHIFTER.
APPLICATION FILED AUG. 25, 1911.
1,036,466.
Patented Aug. 20, 1912.
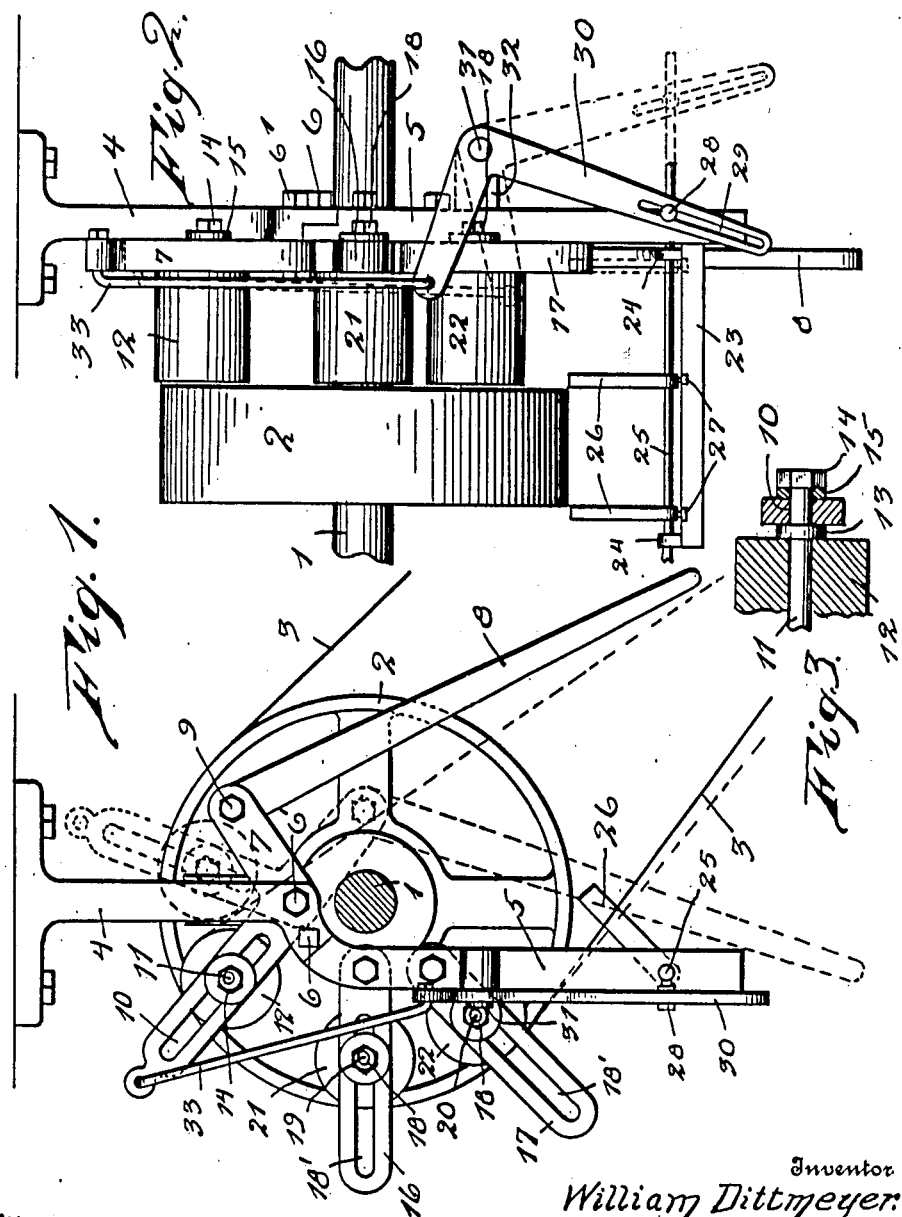
Witnesses
J. Milton Jester
B. F. Kichburne
Inventor
William Dittmeyer
By
C. L. Parker
Attorney

UNITED STATES PATENT OFFICE.

WILLIAM DITTMEYER, OF ROME, NEW YORK.

BELT-SHIFTER.

1,036,466.  Specification of Letters Patent.  Patented Aug. 20, 1912.

Application filed August 25, 1911. Serial No. 645,917.

*To all whom it may concern:*

Be it known that I, WILLIAM DITTMEYER, a citizen of the United States, residing at Rome, in the county of Oneida and State of New York, have invented certain new and useful Improvements in Belt-Shifters, of which the following is a specification.

This invention relates to a belt shifter for removing a belt from a fast pulley and placing the same thereon where an idle or loose pulley is not employed to coöperate with the fast pulley.

An important object of this invention is to provide means of the above mentioned character, whereby the belt may be quickly and easily shifted without subjecting the operator to danger or without injuring the belt.

A further object of the present invention is to provide a belt shifter, which is simple in construction and reliable and positive in operation.

Other objects and advantages of this invention will be apparent during the course of the following description.

In the accompanying drawings forming a part of this specification and in which like numerals are employed to designate like parts throughout the same, Figure 1 is a side view of the device, and, Fig. 2 is a front view of the same, and Fig. 3 is a detail view of a shaft.

In the drawings wherein is illustrated a preferred embodiment of my invention, the numeral 1 designates a line shaft upon which is mounted a pulley 2, fast thereon, to be engaged by a belt 3. Disposed near and to one side of this pulley is a fixed depending bracket 4, having connection at its lower end with an angularly adjustable arm 5, by means of a bolt 6, as shown. This bolt may be manipulated to clamp the arm 5 in adjustment at different angular positions. Pivotally connected with the lower portion of the bracket 4 by means of a bolt 6', is a bell-crank lever 7, having connection at one end with an operating lever or handle 8, such connection being effected through the medium of a bolt 9, whereby the lever 8 may be angularly adjusted and locked at different positions with relation to the bell-crank lever. The forward arm of the bell crank lever 7 is provided with an elongated slot 10, for receiving a shaft 11, carrying a roller 12. The shaft 11 is provided adjacent the bell-crank lever with a flange 13 and upon the opposite side of the bell-crank lever with a clamping nut 14, having a washer 15 interposed between the same and said bell-crank lever. It is thus seen that the shaft 11 and its roller may be adjusted radially corresponding to the size of the pulley 2 and the shaft 11 subsequently clamped to the bell-crank lever. Connected with the angularly adjustable arm 5 are arms 16 and 17 by means of bolts 18, whereby an angular adjustment of these arms may be had with respect to the arm 5 if desired. The arms 16 and 17 are provided with elongated slots 18', for receiving shafts 19 and 20, which are adjustable in said slots 18' and are just like the shaft 11. The shafts 19 and 20 carry respectively rollers 21 and 22, as shown.

Rigidly connected with the lower end of the arm 5 is a horizontal arm or bar 23, carrying guides 24, which receive a reciprocatory rod 25 that cannot turn therein. The rod 25 carries upstanding belt shifting fingers 26, which are adjustably mounted upon the rod 25 and clamped in different positions by bolts 27. The rod 25 extends through a suitable opening formed in the lower portion of the arm 5 and is provided outwardly of the same with a pin 28, operating within an elongated slot 29 formed through the lower arm of a bell-crank lever 30. This bell-crank lever is pivoted, as shown at 31 with a bracket 32, rigidly connected with the arm 5, as shown. The upper arm of the bell-crank lever 30 is connected with the corresponding arm of the bell-crank lever 7 through the medium of a rigid link 33.

The operation of the device is as follows:—Assuming that the belt 3 is operating upon the rotating pulley 2 and it is desired to shift the same from this pulley, the operator forces the lever 8 upwardly, which lowers the rollers 12 by a proper movement of the belt crank lever 7. Simultaneously with the movement of the bell-crank lever 7 the bell-crank lever 30 is operated to move the rod 25 to the right, whereby the fingers 26 shift the belt 3 from the pulley 2 onto the rollers 12, 21 and 22, such belt then assuming the position as indicated in dotted lines in Fig. 1. When returning the belt 3 to the pulley 2, the lever 8 is moved downwardly, swinging bell-crank lever 7 for raising the roller 12, which travels a little above the periphery of said pulley. Simultaneously with the movement of the bell-crank lever 7, the link 33 moves the bell-crank lever 30 to the left, whereby the rod 25 is moved in that direction and the fingers 26 shift the belt 3 onto the pulley 2.

I wish it understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. The combination with a pulley and its belt, of a swinging element disposed near one side of the pulley, a roller carried by the swinging element, a stationary support, a roller carried by the stationary support and disposed adjacent the first named roller, laterally movable belt shifting mechanism, means to move the swinging element in a plane parallel to the plane of rotation of the pulley, and means connecting the swinging element and laterally movable belt shifting mechanism so that they operate together.

2. The combination with a pulley and its belt, of a pivoted element disposed near one side of the pulley, to be swung in a plane parallel to the plane of rotation of the pulley, a roller carried by the pivoted element, a fixed support, a plurality of rollers carried thereby and disposed adjacent the first named roller, a laterally movable belt shifting mechanism, a lever for operating the belt shifting mechanism, a link connecting said lever and pivoted element, and means to swing the pivoted element.

3. The combination with a pulley and its belt, of a pivoted element disposed near one side of the pulley and to be swung in a plane substantially parallel to the plane of rotation of the pulley, a roller carried by said pivoted element, a plurality of fixed supports, a plurality of rollers carried by said plurality of fixed supports, a laterally movable belt shifting device, a pivoted element to move the said laterally movable belt shifting device, a link connecting the first and second named pivoted elements, and means to move the first named pivoted element.

4. The combination with a pulley and its belt, of a fixed support, a bell-crank lever pivotally mounted thereon, a roller adjustably mounted upon the bell-crank lever, a plurality of rollers adjustably mounted upon said fixed support, a belt shifting device, a bell-crank lever for operating the same, a link connecting said bell-crank levers, and means to move the first named bell-crank lever.

5. The combination with a pulley and its belt, of a fixed support, an arm angularly adjustably mounted thereon, a roller connected with the arm, a bell-crank lever pivoted with the fixed support, a roller mounted upon said bell-crank lever, a belt shifting device, a bell-crank lever to move the same, a link connecting the bell-crank levers, and an operating lever to move the first named bell-crank lever.

6. The combination with a pulley, of a plurality of rollers disposed near one side of the pulley in a superposed series and upon one side of the center of rotation of the pulley, a pivoted element for supporting the uppermost of the rollers, a fixed element for supporting the lower rollers, and laterally movable belt shifting mechanism having connection operable simultaneously with the pivoted element.

In testimony whereof I affix my signature in presence of two witnesses.

WILLIAM DITTMEYER.

Witnesses:
  John B. Bowers,
  Mathias F. Schonbachler.

Copies of this patent may be obtained for five cents each, by addressing the "Commissioner of Patents, Washington, D. C."